(12) United States Patent
Mukaino et al.

(10) Patent No.: US 7,100,715 B2
(45) Date of Patent: Sep. 5, 2006

(54) IDLER GUIDE UNIT

(75) Inventors: Masayuki Mukaino, Chattanooga, TN (US); Ken Law, Chattanooga, TN (US)

(73) Assignee: Komatsu Ltd., Tokyo (JP)

( * ) Notice: Subject to any disclaimer, the term of this patent is extended or adjusted under 35 U.S.C. 154(b) by 36 days.

(21) Appl. No.: 10/714,905

(22) Filed: Nov. 18, 2003

(65) Prior Publication Data

US 2005/0103539 A1    May 19, 2005

(51) Int. Cl.
*B62D 55/15* (2006.01)
(52) U.S. Cl. .................. 180/9.1; 305/116; 305/150
(58) Field of Classification Search ........... 180/9.1, 180/9.48; 305/116, 150, 153, 154, 156, 143, 305/138, 145
See application file for complete search history.

(56) References Cited

U.S. PATENT DOCUMENTS

| | | | | |
|---|---|---|---|---|
| 2,315,421 A | * | 3/1943 | Heaslet | 305/154 |
| 3,336,087 A | * | 8/1967 | Reinsma | 305/109 |
| 3,841,715 A | * | 10/1974 | Comer et al. | 305/146 |
| 3,907,382 A | * | 9/1975 | Kessinger, Jr. | 305/138 |
| 4,101,177 A | * | 7/1978 | Bianchi et al. | 305/138 |
| 4,738,494 A | * | 4/1988 | Bedis | 305/138 |
| 5,096,270 A | * | 3/1992 | Oilund et al. | 305/129 |
| 5,139,317 A | * | 8/1992 | Larson et al. | 305/137 |

FOREIGN PATENT DOCUMENTS

| | | |
|---|---|---|
| JP | 5-40090 | 5/1993 |
| JP | 6-49285 | 7/1994 |

\* cited by examiner

*Primary Examiner*—Anne Marie Boehler
(74) *Attorney, Agent, or Firm*—Posz Law Group, PLC; R. Eugene Varndell, Jr.

(57) ABSTRACT

An idler guide unit for crawler type traveling apparatuses which attains the facilitation of clearance regulating operations and the reduction, which is owing to the facilitation of the mentioned operations, of traveling noise. This idler guide unit is formed so that the clearance regulating operations are carried out by using tapering blocks 26, position regulators 41, 50 for the tapering blocks 26 being also provided.

6 Claims, 6 Drawing Sheets

IDLER GUIDE UNIT

BACKGROUND OF THE INVENTION

1. Field of the Invention

This invention relates to an idler guide unit.

2. Description of the Related Art

As known well, in a crawler type traveling apparatus in a bulldozer, a power shovel and a crawler crane, an axis-to-axis distance of a sprocket and an idler is set so that a crawler normally has a desired degree of slack. This enables a slackened-side portion of the crawler to be rendered free from the reception of the application of a tensile force, though a driving-side portion (a side-portion that is pulled by the sprocket) of the crawler encounters the occurrence of a tensile force. Thus, the reduction of the internal friction of the crawler and the traveling resistance thereof due to the internal friction thereof is attained.

When earth and sand and rocks eat into, for example, meshed portions of the sprocket and crawler during a practical operation of the crawler, a tensile force (which will hereinafter be referred to as shoe tension) occurs over the whole circumference of the crawler. When the shoe tension in such a case is not higher than a predetermined level, the earth and sand and rocks eating into the meshed portions mentioned above are collapsed with the above-mentioned axis-to-axis distance kept unchanged. Thus, the slippage (which will hereinafter be referred to as a jump) of the meshed sprocket and crawler and the dislocation of the crawler are prevented. When the shoe tension becomes not lower than a predetermined level, the idler is reversed (which will hereinafter be referred to as recoiling), and the traveling apparatus is thereby protected. As a means for enabling such inconveniences to be eliminated, an idler guide apparatus supporting bearings for the idler so that the bearing can be slid in the longitudinal direction of the traveling apparatus.

However, in this structure, the idler guide unit is used as it is exposed to dust or the weather, so that the width of a clearance between the crawler and sprocket is liable to increase. In the clearance width-increased condition, the traveling noise increases due to the striking sounds occurring in the clearance during a movement of a crawler type traveling apparatus, and this would give rise to a serious trouble. In order to regulate the width of the clearance, it is necessary to remove the idler of large mass, and repair a worn part by welding or replace such a part. Therefore, the maintenance and repair work for the crawler costs a great deal.

The patent literature 1 [JP-A-5-40090 (pages 6 to 7, FIG. 1 and FIG. 2)] discloses a structure as an example of a means for solving these problems which attains the restraining of an increase in width of a lateral clearance in an idler guide unit by increasing the width of a vertical clearance therein, and the disusing of a lateral-clearance regulating operation.

An example of a related art idler guide unit will be described with reference to FIGS. 5 to 6 by taking this patent literature 1 as an example literature.

FIG. 5 is a side view of a crawler type traveling apparatus to which a related art idler guide unit is applied, and FIG. 6 a sectioned front view, a drawing illustrating the same idler guide unit, taken along the line L—L in FIG. 5.

First, referring to FIG. 5, a traveling apparatus is formed by providing a sprocket at a rear end portion of a track frame 61, an idler 65 at a front end portion thereof, lower rolling wheels 15 at a lower portion thereof, and upper rolling wheels 16 at an upper portion thereof respectively, and by winding a crawler 17 around the sprocket, idler 65, lower rolling wheels 15 and upper rolling wheels 16.

The track frame 61 is provided on an upper portion thereof with a spring box 68, and the idler 65 is rendered able to be recoiled by a spring (not shown) in the spring box 68, the idler 65 being formed so that the idler 65 can be recoiled as the idler is guided by an idler guide unit 70 provided on bearings.

Next, referring to FIG. 6, the idler guide unit 70 has bearings 72 fastened by bolts 76 to left and right end portions of an idler shaft 71 which supports the idler 65 thereon. The bearings 72 are provided with upper guides 73, to which guide plates 75 are fixed, and lower guides 74, and the upper and lower guides are engaged with guide plates 82 on an upper surface of the track frame and guide brackets 84 on inner surfaces of the track frame respectively. A vertical movement of the idler 65 is restricted by this arrangement.

Guide brackets 90, 90 are fastened by bolts 93 to outer end surfaces of the left and right bearings 72, 72 respectively via shims 92, 92. Guide surfaces 91, 91 of the guide brackets 90, 90 are engaged with guide plates 83, 83 on left and right outer side surfaces 81, 81 of the track frames 80 via clearances S1. A lateral movement of the idler 65 is restricted by this arrangement.

The left and right outer side surfaces 81, 81 of the track frame 80 and outer side surfaces of the guide plates 83, 83 are formed into downwardly divergent surfaces, i.e. left and right tapering surfaces.

When the upper guides 73 of the bearings 72 and the guide plates 82 on the upper surfaces of the track frames in the above-described structure shown in FIGS. 5 to 6 are worn, the bearings 72 are moved down. This causes the clearances S1 between the inclined guide plates 83, 83 on the left and right outer side surfaces 81, 81 of the track frames 80 and the guide surfaces 91, 91 of the guide brackets 90, 90 to decrease. As a result, even when the guide plates 83, 83 and guide surfaces 91, 91 are worn, the width of the clearances S1 does not increase, so that operations for regulating the lateral width of the clearances are said to become unnecessary.

However, the construction of the related art idler guide unit 70 shown in FIGS. 5 to 6 has the following problems.

(1) The idler 65 does not always receive a downwardly directed force. For example, when a working vehicle runs on a wasteland, the idler 65 is thrust up due to projecting parts of the ground surface. When the traveling apparatus is moved rearward, shoe tension is applied to an upper portion of the crawler of the apparatus, and the idler 65 is lifted. Consequently, when the width of a vertical clearance of the idler guide unit increases, vertical movements of the idler 65 become large during the running of the working vehicle, and traveling noise increases due to the striking sounds of the clearance-forming parts occurring during such large vertical movements of the idler 65.

(2) In the condition described in (1) above, the lateral clearance reducing effect of the inclined surfaces of the guide plates 83, 83 is not displayed but the lateral vibration of the idler 65 occurs. The striking sounds of the clearance-forming parts also occur during such time.

(3) When a load is imparted to a working machine in a working vehicle, a crawler type traveling apparatus retains the stability of front and rear portions of the vehicle by using the idler and sprocket as front and rear fulcrums. Therefore, in general, the progress of the wear on the vertical guide portions 75, 74, 82, 84 of an idler guide unit is speedier than that of the wear on the lateral guide portions 83, 83, 91, 91 thereof. On the other hand, the above-mentioned structure of the related art idler guide unit does not have clearance regulating means for the vertical guide portions 75, 74, 82, 84, so that the clearances are left in an increased state unless the guide plates 75, 82 are replaced. As a result, the crawler type traveling apparatus is a crawler type traveling apparatus generating a large traveling noise.

(4) As a clearance regulating method, repairing the guide plates 75, 82 by welding, or replacing the same is needed. In order to carry out the repairing or replacing of the guide plates, the idler of large mass has to be removed. Therefore, the crawler type traveling apparatus necessarily becomes a crawler type traveling apparatus of a high maintenance and repair cost.

SUMMARY OF THE INVENTION

The present invention has been made with the inventor's attention paid to these problems, and one of the objects of the present invention is to provide an idler guide unit for crawler type traveling apparatuses which attains the facilitation of clearance regulating operations and the reduction of traveling noise which is ascribed to the facilitation of clearance regulating operations.

To achieve this object, a first invention provides an idler guide unit for crawler type traveling apparatuses which is formed so that clearance regulating operations are carried out by using tapering blocks.

According to the first invention, the tapering blocks are provided, for example, between bearings, which support left and right end portions of an idler shaft, and upper surfaces of track frames, and guide plates contacting each other are fixed to lower surfaces of the tapering blocks and upper surfaces of the track frames. Therefore, even when the guide plates are worn to cause the idler shaft to move down, the position of the idler shaft can be corrected in the upward direction by moving the tapering blocks. This enables increased portions of the clearances, which occur due to the wear on the guide plates, in the idler guide apparatus to be corrected.

In a second invention, which is in accordance with the idler guide unit of the first invention, position regulators for the tapering blocks are provided.

According to the second invention , the effect of easily correcting the position of the idler of large mass in the upward direction can be obtained in addition to the operation and effect of the first invention by shifting the positions of the tapering blocks by using the tapering block position regulators. This enables the elimination of increased portions of the widths of the clearances, which occur due to the wear on the guide plates, in the idler guide unit to be attained easily.

As a result, an idler guide unit for crawler type traveling apparatuses, attaining the facilitation of the regulation of widths of the clearances and the reduction of the level of traveling noise can be provided.

BRIEF DESCRIPTION OF THE DRAWINGS

The present invention will now be described with reference to the accompanying drawings, wherein.

DESCRIPTION OF THE PREFERRED EMBODIMENTS

The first and second modes of embodiment of the idler guide unit according to the present invention will now be described in detail with reference to FIGS. 1 to 5 with a bulldozer taken as an example to which the invention is applied.

First, the first mode of embodiment will be described with reference to FIGS. 1 to 3.

Figure 1:
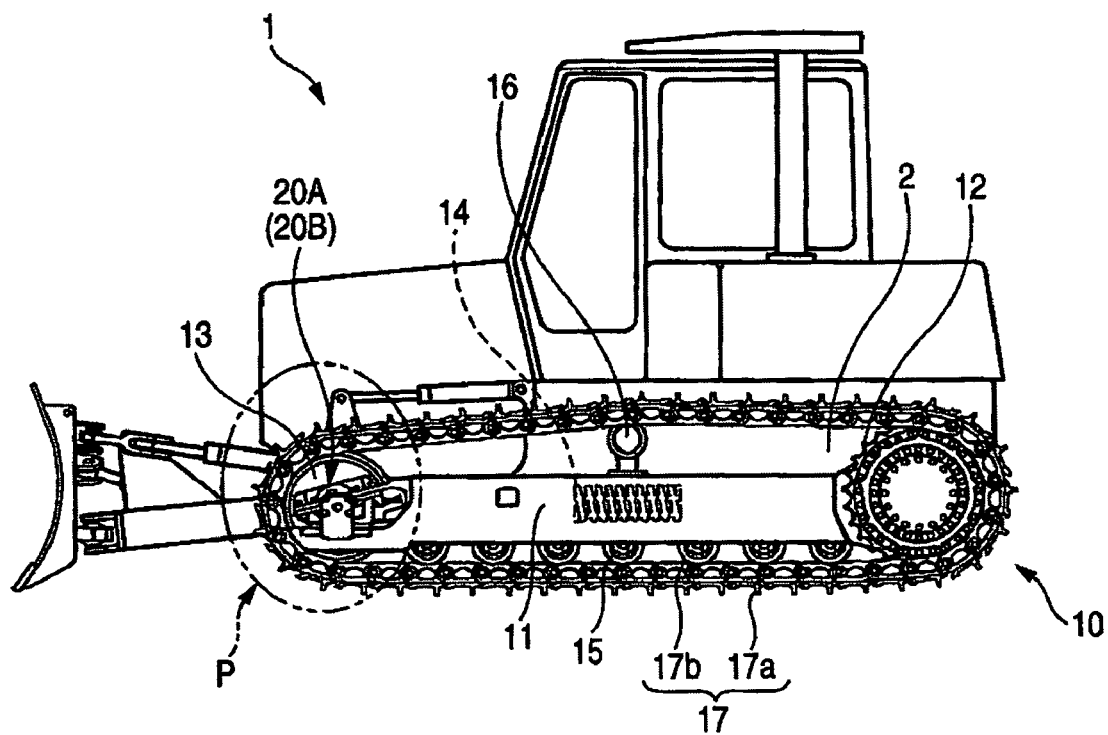
FIG. 1 is a side view of a bulldozer having a crawler type traveling apparatus to which the idler guide unit according to the present invention is applied.
Figure 2:
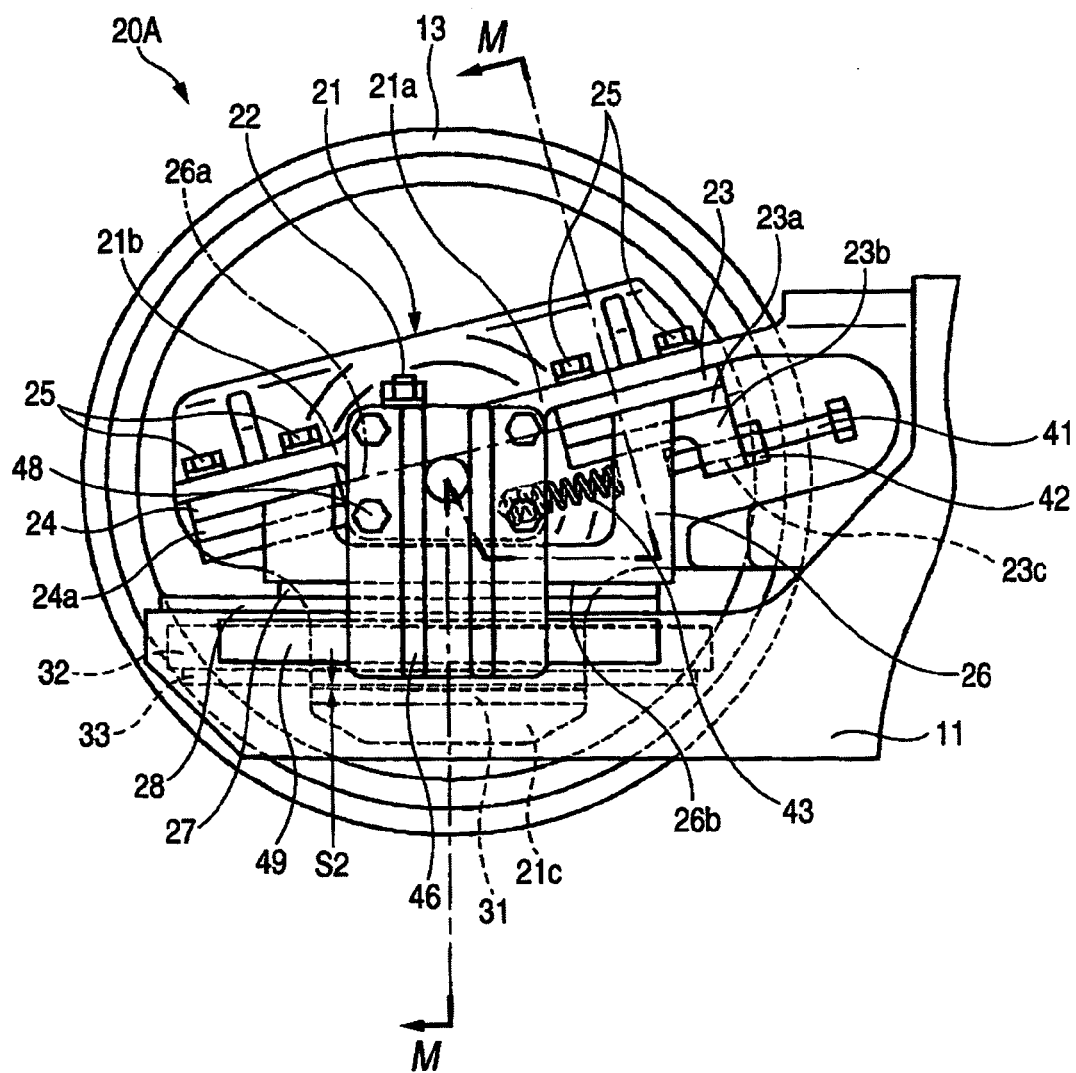
FIG. 2 is a detail drawing in side elevation of a portion P of FIG. 1 of a first mode of embodiment of the idler guide unit according to the present invention.
Figure 3:
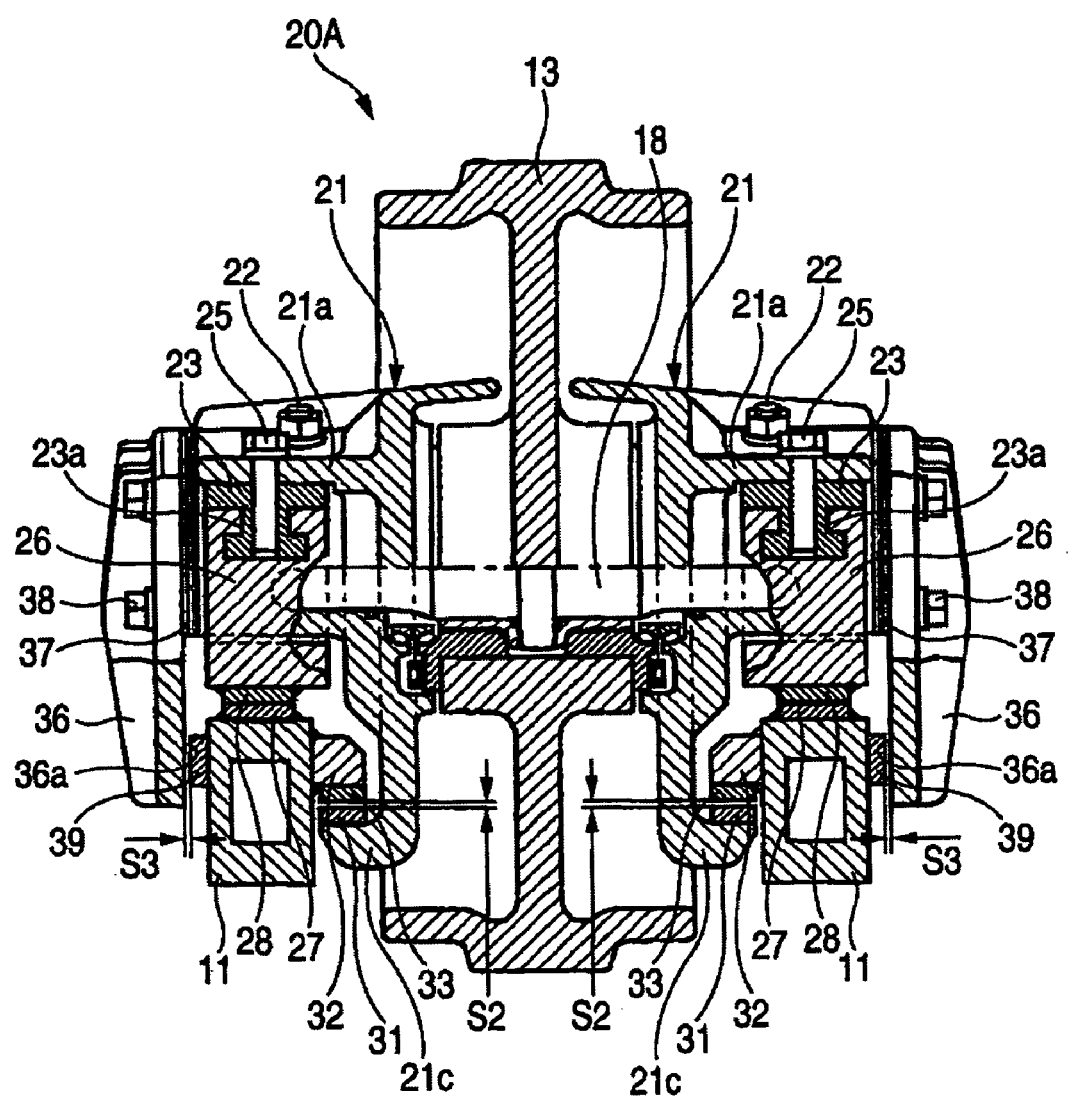
FIG. 3 is a sectioned rear view taken along the line M—M in FIG. 2.
Figure 6:
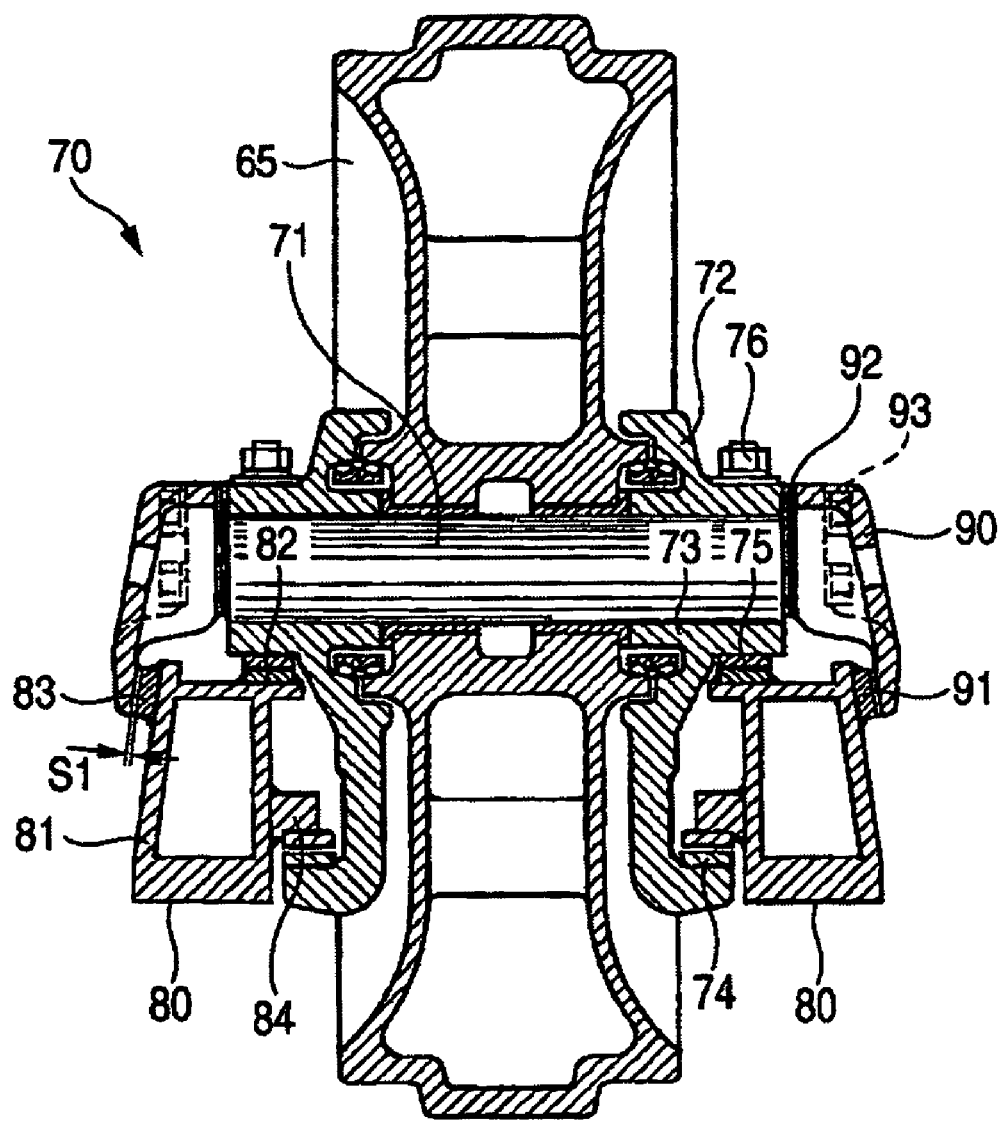
FIG. 6 is a sectioned front view taken along the line L—L in FIG. 5, illustrating the same idler guide unit.

FIG. 1 is a side view of a bulldozer having a crawler type traveling apparatus to which the idler guide unit according to the present invention is applied, FIG. 2 a detail drawing in side elevation of a portion P of FIG. 1 of the first mode of embodiment of the idler guide unit according to the present invention, and FIG. 3 a sectioned rear view taken along the line M—M in FIG. 2. The constituent elements of this embodiment identical with those of the idler guide unit of FIGS. 5 and 6 will be represented by the same reference numerals, and the description of such elements will be omitted.

First, referring to FIG. 1, a bulldozer 1 has a longitudinally elongated frame 2 in a central portion thereof, and crawler type traveling apparatuses 10 fixed to left and right side portions of the frame 2. An idler is provided longitudinally movably at a front end portion of a track frame 11 of each crawler type traveling apparatus 10 via an idler guide unit 20A or 20B. The idler can be recoiled when a recoil spring 14 in the track frame 11 is bent.

Referring to FIGS. 2 to 3, the idler guide unit 20A is formed by fixedly mounting by bolts 25, 25 bearings 21 on left and right end portions of an idler shaft 18 on which an idler 13 is supported, fastening rails 23, 24 by bolts 25, 25 to lower surfaces of flange portions 21a, 21b projecting in the outward direction of the bearings 21 and having longitudinally extending inclined surfaces, fixedly fitting upper portions of tapering blocks 26, the tapering surfaces of which are formed by inclined surfaces 26a and bottom surfaces 26b, in grooves 23a, 24a of the rails 23, 24 so that the upper portions of the tapering blocks 26 can be slid in the longitudinal direction, bringing slide plates fixed to lower surfaces of the tapering blocks 26 into contact with slide plates fixed to upper surfaces of the track frames 11, supporting the bearings 21 on the tapering blocks 26, and enabling vertical positions of the bearings 21 to be regulated by longitudinally moving the tapering blocks 26.

Hook portions 21c are formed at lower portions of the bearings 21, and guide plates 31 fixed to upper surfaces of the hook portions 21c are opposed via clearances (or clear spaces) S2 of a predetermined width to guide plates 33 fixed to lower surfaces of brackets 32 provided on inner side surfaces of the track frames. The width of the clearances S2 can be selected arbitrarily by regulating the vertical position of the bearings 21 on the basis of longitudinal movements of the tapering blocks 26.

As a position regulator for each tapering block 26, a regulating bolt 41, on which a lock nut 42 is mounted, is screwed in a threaded hole 23c made in a projection 23b, which is formed on a rear portion of the tapering block 26, of the rail 23. The regulating bolt 41 is adapted to regulate the longitudinal position of the tapering block 26, and the resultant position is fixed by the lock nut 42. A spring 43 is adapted to restrain an unnecessary forward movement, i.e. play of the tapering block 26.

Guide brackets 36 are fastened to outer end surfaces of the left and right bearings 21, 21 via shims 37 by a required number of bolts 38, and guide surfaces 36a of the guide brackets 36 are opposed via clearances (or clear spaces) S3 to guide plates 39 fixed to outer side surfaces of the track frames 11, the width of each clearance S3 being able to be regulated by increasing or decreasing the thickness of the relative shim 37.

When the width of the clearance S2 in the above-described structure of the first mode of embodiment shown in FIGS. 1 to 3 increases due to the wear on the guide plates 27, 28, 31, 33 which restrict the vertical movements of the idler, the clearance S2 can be regulated easily by pushing out the tapering block 26 forward by the regulating bolt 41. When the width of each clearance S3 increases due to the wear on the guide plates 39, 39, which are adapted to restrict the lateral movements of the idler, and the guide surfaces 36a, 36a, the width of the clearance S3 can be regulated easily by increasing or decreasing the thickness of the relative shim 37.

Next, the second mode of embodiment will be described with reference to FIG. 4.

Figure 4:
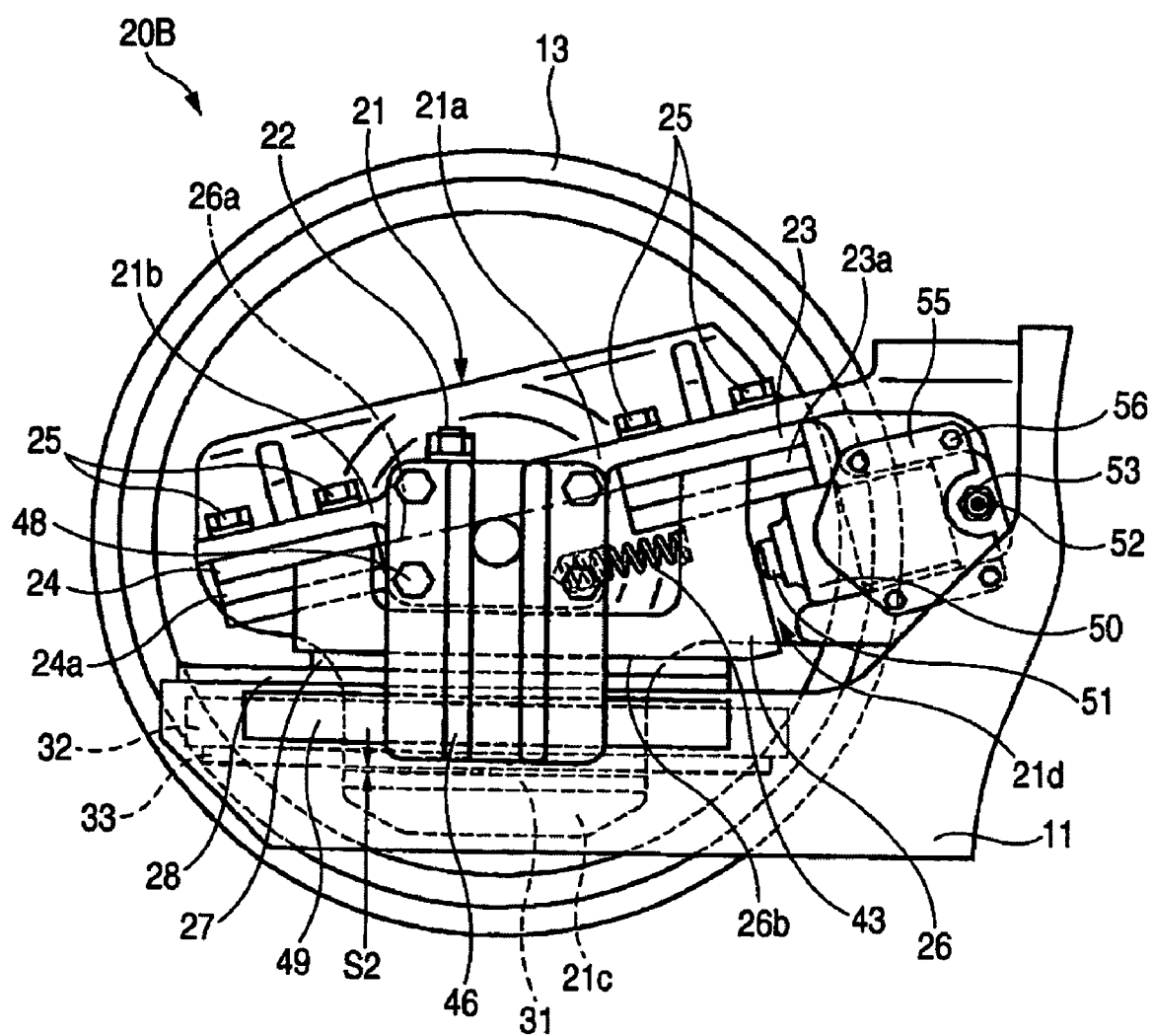
FIG. 4 is a detail drawing in side elevation of a portion, which corresponds to the portion P of FIG. 1, of a second mode of embodiment of the idler guide unit according to the present invention.
Figure 5:
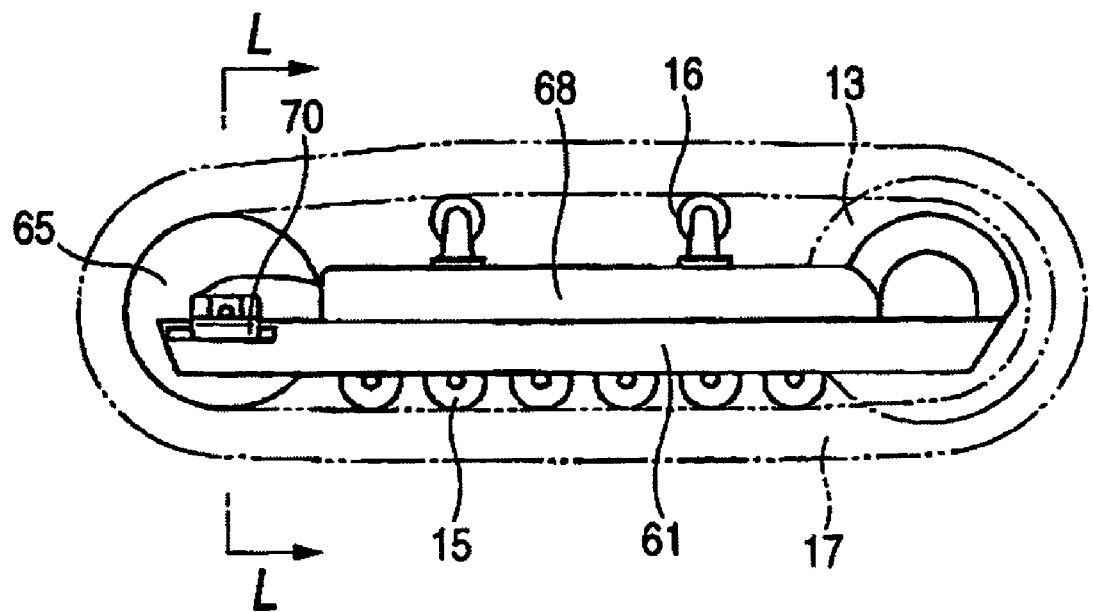
FIG. 5 is a side view of a crawler type traveling apparatus to which a related art idler guide unit is applied.

FIG. 4 is a detail drawing in side elevation showing a portion, which corresponds to the part P of FIG. 1, of the second mode of embodiment of the idler guide unit according to the present invention. The constituent elements shown in FIGS. 1 to 3 and FIGS. 5 to 6 and identical with each other will be represented by the same reference numerals, and a description thereof will be omitted.

Referring to FIG. 4, an idler guide unit 20B is provided with a grease cylinder 50 in a recess 21d of a bearing 21 which is at the rear side of a tapering block 26, the grease cylinder being fixed to a bracket 55 by bolts 56 to constitute a position regulator for a tapering block 26. When grease is injected into a grease nipple 52 with a valve screw 53 of the grease cylinder 50 loosened, a piston 51 can be pushed out. This enables the position of the tapering block 26 to be regulated by the piston 51.

In the structure of the second mode of embodiment shown in FIG. 4, the regulation of the width of a clearance S2 becomes able to be made easier.

In the above-described structure, an example using a grease cylinder 50 is described as the position regulator for the tapering block 26. The position regulator is not limited to a regulator using the grease cylinder 50. The position regulator for the tapering block 26 may be formed by providing, for example, a hydraulic cylinder (not shown), and connecting this hydraulic cylinder to a hydraulic pressure source (not shown) in a vehicle body (not shown) via a pipe (not shown).

As a result, an idler guide unit for crawler type traveling apparatuses which attains the facilitation of the clearance regulating operations and the reduction, which is owing to the facilitation of the clearance regulating operations, of traveling noise can be provided.

The above is a description of modes of embodiment of the idler guide unit for a crawler type traveling apparatus of, for example, a bulldozer. The crawler type traveling apparatus to which the idler guide unit is applied is not limited to the crawler type traveling apparatus of a bulldozer. This idler guide unit can be applied universally to other kind of crawler type traveling apparatus, and used practically in the same manner as in the above-mentioned embodiments. Moreover, the same operation and effect as mentioned above can be obtained.

What is claimed is:

1. A crawler traveling apparatus, which comprises:
   a track frame,
   an idler recoiled by a spring of a spring box arranged on the track frame,
   a sprocket arranged at a rear end of the track frame, and
   a crawler winding around the idler and sprocket, and
   the idler being supported by an idler shaft of an idler guide unit, and
   the idler guide unit including an upper plate arranged on the track frame and a lower guide plate arranged on the idler guide unit, and a tapering block moving over the track frame for maintaining or adjusting a clear space between the upper and lower guide plates.

2. The crawler traveling apparatus according to claim 1, further including a position regulator for adjusting the position of the tapering block relative to the upper and lower guide plates.

3. The crawler traveling apparatus according to claim 1, wherein the position regulator includes a grease cylinder.

4. The crawler traveling apparatus according to claim 1, further including means for regulating a widthwise clear space between a side guide plate arranged on the track frame and a side guide plate secured on the idler guide unit by use of a shim selected from a group of shims of varying thicknesses.

5. In combination, a track frame of a crawler traveling apparatus, an idler and an idler guide unit, the idler guide unit including an upper guide plate arranged on the track frame, a lower guide plate secured on the idler guide unit, a clear space arranged between the upper and lower guide plates, and a tapering block arranged between the idler guide unit and the track frame, the tapering block moving relative to the track frame for maintaining and adjusting the clear space between the upper and lower guide plates.

6. The combination according to claim 5, including a position regulator for moving the tapering block.

* * * * *